United States Patent [19]

Mueller

[11] Patent Number: 5,789,046
[45] Date of Patent: Aug. 4, 1998

[54] HIGH MELT FLOW POLYPROPYLENE MEDICAL FILM

[75] Inventor: Walter B. Mueller, Inman, S.C.

[73] Assignee: W. R. Grace & Co.-Conn., Duncan, S.C.

[21] Appl. No.: 450,059

[22] Filed: May 25, 1995

Related U.S. Application Data

[63] Continuation-in-part of Ser. No. 659,216, Feb. 22, 1991, abandoned, which is a continuation-in-part of Ser. No. 558,042, Jul. 25, 1990, abandoned.

[51] Int. Cl.⁶ .................... B32B 1/08; B32B 27/30; B32B 27/32; B32B 27/34; B32B 27/36
[52] U.S. Cl. .................. 428/35.2; 428/141; 428/475.8; 428/476.1; 428/476.3; 428/476.9; 428/483; 428/517; 428/519; 428/520; 428/521; 428/522
[58] Field of Search .................. 428/141, 483, 428/517, 519, 520, 521, 522, 476.3, 475.8, 476.1, 476.9, 35.2

[56] References Cited

U.S. PATENT DOCUMENTS

| | | | |
|---|---|---|---|
| 4,188,443 | 2/1980 | Mueller et al. | 428/216 |
| 4,194,039 | 3/1980 | Mueller | 428/213 |
| 4,196,240 | 4/1980 | Lustig et al. | 428/35 |
| 4,401,536 | 8/1983 | Lundell et al. | 204/159 |
| 4,599,276 | 7/1986 | Martini | 428/520 |
| 4,643,926 | 2/1987 | Mueller | 428/35 |
| 4,927,691 | 5/1990 | Bekele | 428/352 |
| 4,938,683 | 7/1990 | Boice | 428/517 |
| 4,952,451 | 8/1990 | Mueller | 428/218 |
| 4,977,022 | 12/1990 | Mueller | 428/349 |
| 5,075,143 | 12/1991 | Bekele | 428/366 |
| 5,370,968 | 12/1994 | Goss et al. | 430/271 |

FOREIGN PATENT DOCUMENTS 0228819  7/1987  European Pat. Off. .

*Primary Examiner*—D. S. Nakarani
*Attorney, Agent, or Firm*—Thomas C. Lagaly

[57] ABSTRACT

An impact resistant film suitable for making medical solution pouches and medical drainage pouches generally includes an interior layer of a polyolefin such as an ethylene vinyl acetate copolymer, ethylene methyl acrylate copolymer, very low density polyethylene or blends thereof; and outer layers of a high melt flow ethylene propylene copolymer. At least one of the outer layers also includes an elastomer such as a styrene ethylene butylene styrene copolymer. A flexible copolyester can be substituted for one of the outer high melt flow polymer layers. Additional interior layers can also be incorporated in the film structure.

19 Claims, 6 Drawing Sheets

HIGH MELT FLOW POLYPROPYLENE MEDICAL FILM

This application is a continuation-in-part of U.S. Ser. No. 07/659,216 filed Feb. 22, 1991, now abandoned, which in turn is a continuation-in-part of U.S. Ser. No. 07/558,042 filed Jul. 25, 1990, now abandoned.

This invention relates to autoclavable flexible films suitable for the packaging of medical solutions and for collecting urological or other human drainage.

Currently, it is common medical practice to supply liquids such as medical solutions for parenteral administration in the form of disposable, flexible pouches. These pouches should be characterized by collapsibility, transparency, and adequate mechanical strength. They must also be able to resist the relatively high temperatures required for heat sterilization of their contents, for example in an autoclave. Typically, medical solutions and the like are autoclaved at about 253° F. for periods of 15 to 30 minutes.

Another common medical practice is the collection of urine or other human waste in disposable, flexible pouches. Such pouches should be easily openable such that drainage into the pouch is not impeded, e.g., by adhesion between inner film layers which are in contact with one another (prior to filling) on opposing sides of the pouch. Such adhesion, which is commonly referred to as "blocking," can be particularly problematic when attempting to drain a fluid which has a relatively low rate of flow, such as urine, into an empty pouch. In this instance, the fluid pressure developed by the flowing liquid may be insufficient to overcome the adhesive force between opposing sides of the empty pouch. As a result, the fluid may back-up into the patient from which the fluid is drained.

Another desirable property of medical pouches is that they should have good optical properties, i.e., a high degree of clarity and transmission and a low degree of haze. Prior to administering a medical solution from a pouch and into a patient, a visual inspection of the solution contained within the pouch is performed by the medical professional who is performing the administration procedure. Such an inspection provides a cursory determination that the medical solution to be administered is of the proper type and has not deteriorated or become contaminated. In this regard, it is important that the pouch have good optical properties. A medical solution pouch having poor optical properties can easily render a visual inspection of the packaged solution ineffective, thereby causing the medical professional to needlessly discard the pouch. Worse, the medical professional could fail to notice a solution which is of the wrong type, or which had deteriorated or become contaminated.

In the case of medical drainage pouches, the medical professional must similarly be able to perform a visual inspection thereof as fluid is being collected therein. Such visual inspection allows the medical professional to determine whether fluid is indeed draining into the pouch, whether blood or sedimentary particles are present in the drainage, the color of the drainage (which indicates, e.g., concentration), etc.

Presently, such flexible pouches are typically made from a highly plasticized polyvinyl chloride. While meeting the requirements mentioned above, polyvinyl chloride may have some undesirable properties for use as a medical solution pouch because of the possibility of migration of plasticizer from the polyvinyl chloride into the medical solution or the other contents of the pouch so that the solution may become contaminated by potentially toxic material. A question has also arisen concerning whether PVC is adequately chemically neutral to medical solutions. It has also been found that polyvinyl chloride becomes brittle at relatively low temperatures.

Embrittlement and stress-cracking, particularly of the outer surface of medical pouches, has been found to occur in other non-PVC pouches. It is desirable to provide a pouch for the packaging of medical solutions which substantially reduces or eliminates stress-cracking and embrittlement of the pouch material. It is also desirable to provide a drainage pouch which opens easily and has good optical properties.

Of interest in U.S. Pat. No. 4,401,536 issued to Lundell et al which discloses the use of a blend of medical grade radiation-stabilized polypropylene and a copolymer of ethylene and a comonomer selected from the group consisting of vinyl esters of saturated carboxylic acids and alkyl esters of alpha, beta ethylenically unsaturated carboxylic acids, the blend being irradiated.

Also of interest in U.S. Pat. No. 4,643,926 issued to Mueller which discloses a flexible film for medical solution pouches generally including a sealant layer of ethylene propylene copolymer, modified ethylene propylene copolymer, or flexible copolyester; one or more interior layers including elastomeric polymeric materials such as very low density polyethylene; and an outer layer of ethylene propylene copolymer or a flexible copolyester.

Of interest is EP 228 819 (Raniere et al) disclosing a multiple layer film suitable for packaging solutions used for medical services, having three layers including a sealant layer having a polypropylene polymer blended with an elastomeric styrene ethylene butylene styrene copolymer.

DEFINITIONS

The term "high melt flow" is used herein to indicate a melt flow of greater than about 8 grams/10 minutes and less than about 15 grams/10 minutes (ASTM D 1238, Condition L). More preferably, the melt flow ranges from about 10 to 15 grams/10 minutes. Melt flow is generally considered to be inversely proportional to melt viscosity and molecular weight.

The terms "flexible" and the like and "elastomeric" and the like are used herein to define specific polymeric materials as well as characteristics of a resulting pouch or bag whereby improved flexibility and/or collapsibility of the pouch or bag is obtained by the use of these specific polymeric materials. Flexible materials may be characterized by a modulus of preferably less than 50,000 PSI (ASTM D-882-81) and more preferably less than 40,000 PSI (ASTM D-882-81).

The term "film" and the like refers to a thermoplastic material suitable for packaging and having one or more layers of polymeric materials which may be bonded by any suitable means well known in the art.

The term "polymer", "polymeric", and the like, unless specifically defined or otherwise limited, generally includes homopolymers, copolymers and terpolymers and blends and modifications thereof.

The term "interior" and the like is used herein to refer to a layer of a multilayer film which is not a skin or surface layer, or sealant layer, of the film.

The term "melt index" is used herein as the amount, in grams, of a thermoplastic resin which can be forced through a given orifice under a specified pressure and temperature within 10 minutes. The value should be determined in accordance with ASTM D 1238.

The term "ethylene vinyl acetate copolymer" (EVA) is used herein to refer to a copolymer formed from ethylene and vinyl acetate monomers wherein the ethylene derived units in the copolymer are present in major amounts and the vinyl acetate derived units in the copolymer are present in minor amounts.

The term "ethylene propylene copolymer" (EPC) is used herein to refer to a copolymer formed of propylene monomer and minor amounts, usually less than 10% and preferably less than 6% by weight, of ethylene comonomer. This may be a high melt flow EPC, although it does not have to be unless designated as such in this specification or the claims attached hereto.

The term "copolyester" and the like is applied to polyesters synthesized from more than one diol and a dibasic acid. Copolyesters as used herein may also be characterized as copolymers of polyether and polyethylene terephthalate. More preferably copolyesters as used herein may be characterized as polymeric materials derived from 1,4 cyclohexane dimethanol, 1,4 cyclohexane dicarboxylic acid, and polytetramethylene glycol ether, or equivalents of any of the above, as reactants.

The term "modified" and the like is used herein to refer to a polymeric material in which some or all of the substituents are replaced by other materials, providing a change in properties such as improved impact resistance, flexibility or elastomeric properties. In the case of modified ethylene propylene copolymer, the modification is provided by a rubbery block copolymer such as commercially available under the trademark Kraton from the Shell Chemical Company.

The terms "elastomer" and the like are used herein to mean a elastomeric, rubbery or flexible material suitable for use in one or more layers of the present invention. Preferred elastomers are styrene ethylene butylene styrene copolymer (SEBS), styrene butadiene styrene copolymer (SBS), styrene isoprene styrene copolymer (SIS), and ethylene propylene rubber (EPR).

The term "polyolefin" is used herein to refer to olefin polymers and copolymers, especially ethylene polymers and copolymers, and to polymeric materials having at least one olefinic comonomer, such as ethylene vinyl acetate copolymer.

The phrase "homogeneous ethylene/alpha-olefin copolymer" is used herein to refer to ethylene/alpha-olefin copolymerization reaction products of relatively narrow molecular weight distribution and relatively narrow composition distribution. Homogeneous ethylene/alpha-olefin copolymers are structurally different from heterogeneous ethylene/alpha-olefin copolymers, in that homogeneous ethylene/alpha-olefins exhibit a relatively even sequencing of comonomers within a chain, a mirroring of sequence distribution in all chains, and a similarity of length of all chains, i.e., a narrower molecular weight distribution. Furthermore, homogeneous ethylene/alpha-olefin copolymers are typically prepared using metallocene, or other single-site type catalysts, rather than using Ziegler Natta catalysts. Such single-site catalysts typically have only one type of catalytic site, which is believed to be the basis for the homgeniety of the polymers resulting from the polymerization.

SUMMARY OF THE INVENTION

An impact resistant film in accordance with the present invention comprises a first outer layer which comprises elastomer and a high melt flow ethylene propylene copolymer having a melt flow of between about 8 and 15 grams/10 minutes, the elastomer constituting a discontinuous phase dispersed throughout a continuous phase of the high melt flow ethylene propylene copolymer such that the first outer layer has a root mean square (RMS) surface roughness ranging from about 10 to about 500 nm.

In another aspect of the present invention, an impact resistant film comprises a first outer layer which comprises elastomer and a high melt flow ethylene propylene copolymer having a melt flow of between about 8 and 15 grams/10 minutes, the elastomer constituting a discontinuous phase dispersed throughout a continuous phase of the high melt flow ethylene propylene copolymer such that the elastomer is present in discrete domains which have a cross-sectional area ranging from abouit 0.01 to about 10 square micrometers ($\mu m^2$).

Another impact resistant film in accordance with the invention comprises two outer layers each comprising a high melt flow ethylene propylene copolymer and one of the outer layers (preferably the sealant layer) further comprising an elastomer; and an interior layer disposed between the two outer layers, and comprising an ethylene vinyl acetate copolymer (EVA), ethylene methyl acrylate copolymer (EMA) or blends thereof, very low density polyethylene (VLDPE), homogeneous ethylene/alpha-olefin copolymer, and ethylene butyl acrylate copolymer (EBA).

Alternatively, an impact resistant film comprises a first outer layer comprising a blend of a high melt flow ethylene propylene copolymer and an elastomer; a second outer layer comprising a copolyester; and a polymeric adhesive layer disposed between and adhering the first and second outer layers.

In another aspect of the invention, an impact resistant film comprises a first outer layer comprising a blend of a high melt flow ethylene propylene copolymer and an elastomer; a second outer layer comprising a copolyester or polyamide; an interior layer comprising an ethylene vinyl acetate copolymer, ethylene methyl acrylate copolymer or blends thereof, very low density polyethylene, homogeneous ethylene/alpha-olefin copolymer, and ethylene butyl acrylate copolymer; and a polymeric adhesive layer disposed between and adhering the interior layer to the second outer layer.

In yet another aspect of the invention, an impact resistant film comprises a first outer layer comprising a blend of a high melt flow ethylene propylene copolymer and an elastomer; a second outer layer comprising a copolyester or polyamide; a central layer comprising a polyolefin; and polymeric adhesive layers disposed between and adhering the respective outer layers to the central layer.

Alternatively, an impact resistant film comprises two outer layers each comprising a high melt flow ethylene propylene copolymer; a central layer comprising a fractional melt index ethylene vinyl acetate copolymer; an interior layer disposed between each of the two outer layers and the central layer respectively and comprising ethylene vinyl acetate copolymer having a melt index greater than about 1; and one of the outer layers also including an elastomer.

A modification of the above is an impact resistant film comprising two outer layers each comprising a high melt flow ethylene propylene copolymer; a central layer comprising ethylene vinyl acetate copolymer having a melt index greater than about 1; an interior layer disposed between each of the two outer layers and the central layer respectively and comprising a fractional melt index ethylene vinyl acetate copolymer; and one of the outer layers also including an elastomer.

In still another aspect of the invention, an impact resistant film comprises a first outer layer comprising a blend of a high melt flow ethylene propylene copolymer and an elastomer; a second outer layer comprising a copolyester; a central layer comprising a polyolefin; an interior layer disposed between the first outer layer and the central layer, and comprising ethylene vinyl acetate copolymer having a melt index greater than about 1; and a polymeric adhesive layer disposed between and adhering the copolyester layer to the central layer.

In yet another aspect of the invention, an impact resistant film comprises a first outer layer comprising a blend of a high melt flow ethylene propylene copolymer and an elastomer; a second outer layer comprising a copolyester; a central layer comprising a polyolefin; an interior layer disposed between each of the two outer layers and the central layer respectively and comprising ethylene vinyl acetate copolymer having a melt index greater than about 1; and a polymeric adhesive layer disposed between and adhering the copolyester layer to an interior layer.

One additional example of an impact resistant film comprises a first outer layer comprising a blend of a high melt flow ethylene propylene copolymer and an elastomer; a second outer layer comprising a copolyester; a central layer comprising ethylene vinyl acetate copolymer, ethylene methyl acrylate copolymer, or a blend thereof; an interior layer disposed between the first outer layer and the central layer and comprising a fractional melt index ethylene vinyl acetate copolymer; and a polymeric adhesive layer disposed between and adhering the copolyester layer to the central layer.

The present invention also includes a method of making an impact resistant film comprising providing a blend of a high melt flow ethylene propylene copolymer and an elastomer; and extruding a first melt stream of the blend, a second melt stream of ethylene vinyl acetate copolymer, ethylene methyl acrylate copolymer, or a blend of ethylene vinyl acetate copolymer and ethylene methyl acrylate copolymer, and a third melt stream of high melt flow ethylene propylene copolymer, to form a film.

An alternative method of making an impact resistant film comprises providing a blend of a high melt flow ethylene propylene copolymer and an elastomer; and extruding a first melt stream of the blend, a second melt stream of a polymeric adhesive, and a third melt stream of a copolyester, to form a film.

Another aspect of the method comprises providing a blend of a high melt flow ethylene propylene copolymer and an elastomer; extruding a first melt stream of the blend, a second melt stream of ethylene vinyl acetate copolymer, ethylene methyl acrylate copolymer, or a blend of ethylene vinyl acetate copolymer and ethylene methyl acrylate copolymer, a third melt stream of a polymeric adhesive, and a fourth melt stream of a copolyester, to form a film.

In still another aspect of the invention, a method of making an impact resistant film comprises providing a blend of a high melt flow ethylene propylene copolymer and an elastomer; and extruding a first melt stream of the blend, a second melt stream of a polyolefin, a third melt stream of a copolyester, and a melt stream of a polymeric adhesive disposed between each of the first and second melt streams, and the second and third melt streams respectively, to form a film.

In yet another aspect of the invention, a method of making an impact resistant film comprises providing a blend of a high melt flow ethylene propylene copolymer and an elastomer; and extruding the blend as a first melt stream, a second melt stream of ethylene vinyl acetate copolymer having a melt index greater than about 1, a central melt stream of a fractional melt index ethylene vinyl acetate copolymer, a fourth melt stream of ethylene vinyl acetate copolymer having a melt index greater than about 1, and a fifth melt stream of high melt flow ethylene propylene copolymer optionally blended with the elastomer, to form a film.

In still another aspect of the invention, a method of making an impact resistant film comprises providing a blend of a high melt flow ethylene propylene copolymer and an elastomer; and extruding a first melt stream of the blend, a second melt stream of a fractional melt index ethylene vinyl acetate copolymer, a central melt stream of ethylene vinyl acetate copolymer having a melt index greater than about 1, a fourth melt stream of a fractional melt index ethylene vinyl acetate copolymer, and a fifth melt stream of high melt flow ethylene propylene copolymer, to form a film.

In another aspect of the invention, a method of making an impact resistant film comprises providing a blend of a high melt flow ethylene propylene copolymer and an elastomer; and extruding a first melt stream of the blend, a second melt stream of ethylene vinyl acetate copolymer having a melt index greater than about 1, a central melt stream of a polyolefin, a fourth melt stream of a polymeric adhesive, and a fifth melt stream of a copolyester, to form a film.

In still another aspect of the invention, a method of making an impact resistant film comprises providing a blend of a high melt flow ethylene propylene copolymer and an elastomer; and extruding a first melt stream of the blend, a second melt stream of ethylene vinyl acetate copolymer having a melt index greater than about 1, a third melt stream of a polyolefin, a fourth melt stream of ethylene vinyl acetate copolymer having a melt index greater than about 1, and a fifth melt stream of a polymeric adhesive, and a sixth melt stream of a copolyester, to form a film.

An additional embodiment of a method of making an impact resistant film comprises providing a blend of a high melt flow ethylene propylene copolymer and an elastomer; and extruding a first melt stream of the blend; a second melt stream of a fractional melt index ethylene vinyl acetate copolymer; a third melt stream of ethylene vinyl acetate copolymer, ethylene methyl acrylate copolymer, or a blend of ethylene vinyl acetate copolymer and ethylene methyl acrylate copolymer; a fourth melt stream of a polymeric adhesive; and a fifth melt stream of a copolyester, to form a film.

DETAILED DESCRIPTION OF THE PREFERRED EMBODIMENTS

Figure 1:
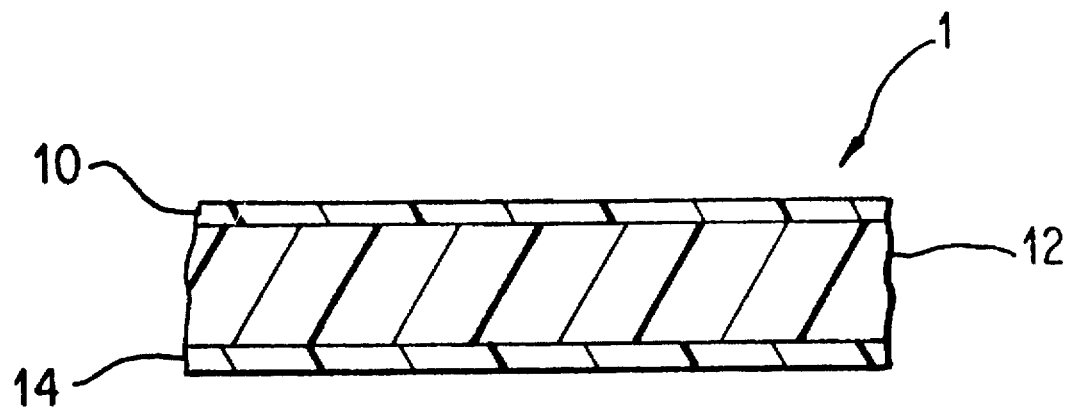
FIG. 1 is a schematic cross-section of a film made in accordance with the invention.

FIG. 1 shows a three layer impact resistant film 1 in accordance with the present invention. First outer layer 10, which preferably serves as a sealant layer, comprises a blend of a high melt flow polypropylene homopolymer or copolymer and an elastomer such as a styrene ethylene butylene styrene copolymer (SEBS). Preferably, the polypropylene homopolymer or copolymer is ethylene propylene copolymer (EPC). The EPC preferably has an ethylene content ranging 2 to 6% and, more preferably, from 4 to 6%. A suitable EPC resin is Z 9550 from Fina, or PLTD 665 from Exxon. The Fina material has an ethylene content of about 6.0%. Both EPC resins have a melt flow of about 10 grams/10 minutes (ASTM D 1238, Condition L). Other high melt flow ethylene propylene copolymers, and polypropylenes (PP) may be used. The elastomer is preferably a styrene ethylene butylene styrene copolymer (SEBS). The SEBS is preferably Kraton™ G 1652. This particular material may be regarded as a thermoplastic rubber, and also as a block copolymer with polystyrene end blocks and a rubbery polyethylene butylene midblock. A preferred blend range for sealant layer 10 includes between about 70% and 95% high melt flow EPC and between about 5% and 30% of an elastomer.

Other suitable elastomers for sealant layer 10 include styrene butadiene styrene copolymer, styrene isoprene styrene copolymer, and ethylene propylene rubber.

Although second outer layer 14 may be identical to sealant layer 10 in terms of composition and thickness, these layers may differ depending on the particular end use. For example, the inner sealant layer 10 may have 20% elastomer to enhance impact resistance, while outer layer 14 may have only 10% elastomer. Elastomers such as SEBS adversely affect optics to some extent. Having a higher % elastomer in the sealant layer instead of the outer layer masks to some extent the loss in optical quality.

Outer layer 14 can also comprise a high melt flow EPC without any blended elastomer. Preferably, elastomer is present in sealant layer 10 and not in outer layer 14. Alternatively, outer layer 14 can comprise copolyester or polyamide.

The blend in outer layers 10 and/or 14 is preferably between 70% and 95% high melt flow ethylene propylene copolymer, and 5% to 30% by weight of elastomers such as styrene ethylene butylene styrene copolymer.

In general, overlying (e.g., stacked or folded) plastic films which have a smooth surface, particularly those with sealant layers, have a tendency to adhere to one another. In the case of medical pouches, the sealant layer generally forms the inner surface thereof. Prior to filling the pouch, e.g., with a drainage fluid or a medical solution (depending upon the intended use of the pouch), it will be in a generally flattened state such that roughly half of the sealant layer is folded upon or otherwise in contact with the other half. In such a state, adhesion (blocking) can easily occur between those portions of the sealant layer which are in contact with one another, particularly when the pouch has been exposed to conditions of heat and/or pressure (e.g., during shipment or storage). Such adhesion can interfere with ability of the pouch to open, thereby impeding or preventing the flow of drainage or other fluids into the pouch.

The foregoing problem of poor openability in medical pouches is overcome when sealant layer 10 comprises a blend of high melt flow EPC and SEBS or other elastomer. The inventor has unexpectedly found that this particular blend eliminates or substantially reduces the problem of blocking as described above. Specifically, at least when blended within the aforementioned weight percentage ranges, an elastomer such as SEBS has been found to form a discontinuous phase which is dispersed in a substantially uniform manner throughout the high melt flow EPC. Relative to the SEBS, the high melt flow EPC is a continuous phase. That is, SEBS has been found to be incompatible with high melt flow EPC such that the SEBS is present in discrete "islands" or "domains" in the high melt flow EPC. These SEBS domains are physically distinct from the surrounding high melt flow EPC in that they have discernible boundary regions which form an interface between the SEBS domain and the surrounding high melt flow EPC. Such SEBS domains are generally tubular in shape with tapered ends, and have a cross-sectional area of about 10 square micrometers ($\mu m^2$) or less. More preferably, the cross-sectional area is about 8 $\mu m^2$ or less. As used herein, the phrase "cross-sectional area" is intended to mean the area of a cross-section taken generally along either a major or minor dimension of the SEBS domains. Given that the SEBS domains are generally tubular shaped with tapered ends, a "major dimension" refers to the longitudinal axis of the domain while a "minor dimension" refers to a dimension which is generally perpendicular to the major dimension. The major dimensions of the SEBS domains are generally aligned and are generally parallel to the machine direction of the film while the minor dimensions are generally parallel to the transverse direction of the film.

The incompatibility of elastomer with high melt flow EPC copolymer provides sealant layer 10 with a surface roughness or texture which is similar to an embossed or matte finish. In particular, the surface roughness of sealant layer 10 has an RMS (root mean square) value of about 500 nm or less. More preferably, the RMS roughness ranges from about 10 nm to about 450 nm, even more preferably from about 100 nm to about 450 nm, more preferably still from about 200 nm to about 450 nm, and most preferably from about 300 nm to about 450 nm. As is well understood, RMS roughness is a measure of the standard deviation of height values (i.e., as measured in a direction which is perpendicular to the surface of the film) within a given film area, and is calculated by determining the average height value for the given area, summing the squares of the differences between the average height and the height of a number of different points in the given area, dividing that sum by the total number of measured points, and then taking the square root of the thus-obtained quotient. By having an RMS surface roughness of 500 nm or less, layer 10 has a reduced tendency to block when this layer is the sealant layer of an impact resistant film and forms the inner surface of a medical pouch. A medical pouch formed from the impact resistant film of the present invention thus opens more readily when drainage fluid or a medical solution begins to flow into the pouch than does a similar pouch which does not have a rough surface, i.e., one which has a relatively smooth surface such as when a low melt flow EPC (below 8 g/10 min.) is blended with an elastomer to form the sealant layer.

The surface roughness of sealant layer 10 also provides additional advantages. In recognition of the fact that roughening the sealant surfaces which are to be in contact with one another can reduce adhesion in a medical pouch, such sealant surfaces are sometimes roughened mechanically, e.g., by embossing the surface, or by adding antiblocking particles to the sealant layer. The "natural" surface roughness of the sealant layer 10 of the present invention (due to the incompatibility of elastomer and high melt flow EPC) eliminates the need for such measures. Moreover, a problem with medical pouches which have embossed or particle-roughened sealant layers is that the optical properties of such pouches are poor (i.e., a high degree of haze and a low degree of clarity). Similarly, when SEBS is blended with high melt flow EPC to form a sealant layer having a blocking-resistant surface in accordance with the present invention, the optical properties are detrimentally affected. However, a further surprising property of the SEBS/high melt flow EPC blend is that when a medical pouch, constructed from a film containing this sealant layer, is filled with a liquid, the initially-poor optical properties dramatically improve. As demonstrated in the Examples below, when wetted with a liquid, the optical properties of a medical film having a sealant layer comprising a blend of SEBS and high melt flow EPC are on par with a film having a smooth, blocking-prone sealant layer formed from a blend of SEBS and low melt flow EPC. Thus, a film having a sealant layer of elastomer and high melt flow EPC in accordance with the present invention has the distinct advantages, when formed into a medical pouch, of easy openability for fluid drainage into the pouch, as well as good optical properties when a fluid is contained therein to permit accurate visual inspection of such fluid.

Interior layer 12, disposed between the two outer layers 10 and 14, comprises ethylene vinyl acetate copolymer (EVA), ethylene methyl acrylate copolymer (EMA), or blends of EVA and EMA. Preferably, the EVA has a vinyl acetate content of between about 18% and 35% by weight of the EVA. Even more preferably, the EVA has a vinyl acetate content of about 28% by weight of the EVA. Several commercially available EVA resins are suitable for interior layer 12. These include Elvax 3175 having a melt index of 6 and a 28% vinyl acetate content by weight of the EVA. Also useful is Elvax 3182, a 3 melt index resin with a vinyl acetate content of about 28% by weight of the EVA. Both of these resins are available from Du Pont. Additionally, Exxon 767.36 (2.5 melt index, 30% vinyl acetate) and Exxon 760.36 (3 melt index, 27.5% vinyl acetate) are also suitable for interior layer 12. Interior layer 12 may also comprise very low density polyethylene (VLDPE), homogeneous ethylene/alpha-olefin copolymer, and ethylene butyl acrylate (EBA). The interior layer 12 comprises preferably between 60 and 90% and more preferably about 80% of the total film thickness exclusive of sacrificial layers to be described hereafter.

Coextruding prior film structures, with differences in viscosity of the respective resins can make coextrusion difficult to perform satisfactorily. For example, severe melt ripples can sometimes result. In these situations, an additional outer layer of for example low density polyethylene is adhered to each of the outer layers. These additional layers function as sacrificial layers which are stripped away after the coextruded film has been produced. This allows the blend layers to function as sealant layers if necessary.

The present invention eliminates the need for sacrificial layers by providing a high melt flow EPC which more closely matches the viscosity of for example relatively thick internal EVA layers.

In an alternative embodiment for FIG. 1, between about 70% and 95% of a high melt flow EPC is blended with between about 5 and 30% of an elastomer such as SEBS. This blend is coextruded with a flexible copolyester such as Ecdel™ 9967 material described below, along with a polymeric adhesive such as those described below) which is disposed between and serves to bond the blend layer to the flexible copolyester layer. In this alternative embodiment, the central polymeric adhesive layer is preferably a thin layer (relative to the two outer layers), compared with the relatively thick central layer 12 as depicted in FIG. 1.

Figure 2:
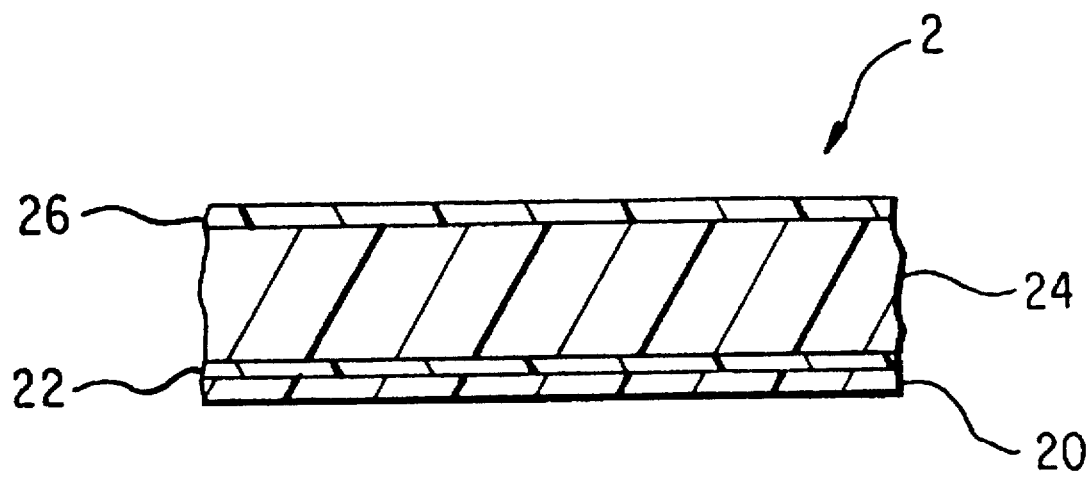
FIG. 2 is a schematic cross-section of another film made in accordance with the invention.

FIG. 2 shows a four layer film made in accordance with the present invention. Outer layer 26 is preferably a blend of high melt flow EPC and the elastomer material described for outer layer 10 of the three layer structure.

Interior layer 24 comprises an EVA, EMA, blends of EVA and EMA, VLDPE, homogeneous ethylene/alpha-olefin copolymer, and EBA such as those described earlier. The second outer layer 20 is a flexible copolyester.

Adhesive layer 22 is a polymeric adhesive such as a modified ethylene methyl acrylate copolymer or modified ethylene vinyl acetate copolymer. Certain ethylene unsaturated ester copolymers, unmodified, may also be suitable for layer 22 in order to bond the interior EVA layer 24 to outer copolyester layer 20.

In addition, other polymeric adhesive materials may be suitable for layer 22 as well as the adhesive layers of other embodiments of the present invention. The choice of these adhesive materials depends on the selection of resins for the remaining layers of the film structure, in particular the resin layers which will be bonded by the adhesive layer. These additional adhesives are preferably chemically modified adhesives, often with acid or acid anhydride functionalities, and include chemically modified versions of the following: linear low density polyethylene, very low density polyethylene, high density polyethylene, polypropylene, and ethylene butyl acrylate.

Suitable chemically modified adhesives include Bynel™ E 361 available from Du Pont, and Plexar™ 3382 available from quantum/USI. The Bynel E 361 material is an EVA based polymeric adhesive with maleic anhydride graft copolymer. The Plexar 3382 material is a EMA based chemically modified polymeric adhesive with maleic anhydride graft copolymer.

Also suitable for layer 22 is modified styrene ethylene butylene styrene copolymer available from Shell Chemical Company as Kraton® FG 1901X rubber.

Figure 3:
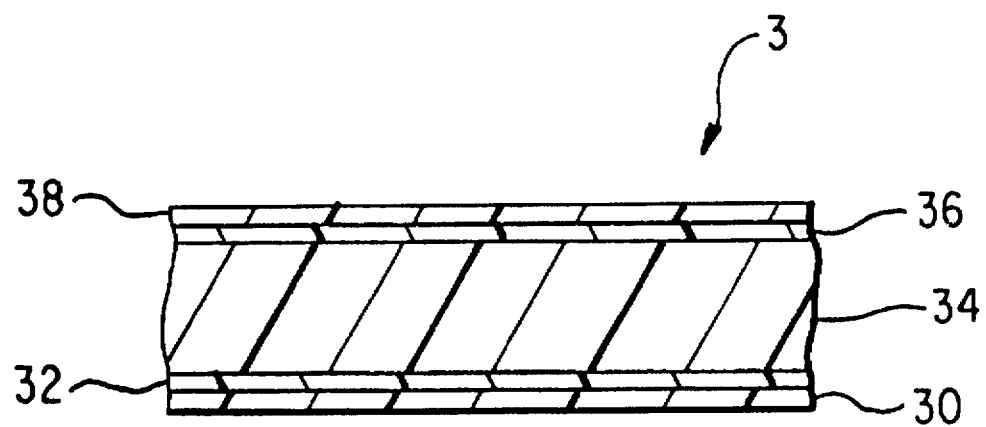
FIG. 3 is a schematic cross-section of yet another film made in accordance with the present invention.

FIG. 3 shows a five layer film 3 substantially like the four layer film described earlier, but with an additional layer 36 of a polymeric adhesive such as a modified ethylene methyl acrylate copolymer or a modified ethylene vinyl acetate copolymer. Layer 36 can also comprise one or more of the adhesives described above for FIG. 2. Layer 36 can also comprise a blend of ethylene propylene copolymer and very low density polyethylene. A preferred blend is 50% EPC and 50% VLDPE. Thus, layer 38 of FIG. 3 corresponds to layer 26 of FIG. 2, layer 34 of FIG. 3 corresponds to layer 24 of FIG. 2, layer 32 of FIG. 3 corresponds to layer 22 of FIG. 2, and layer 30 of FIG. 3 corresponds to layer 20 of FIG. 2.

The outer layers 30 of FIG. 3 and 20 of FIG. 2 are preferably a flexible copolyester.

More preferably, a copolymer of polyether and polyethylene terephthalate, such as Eastman Ecdel 9965 from Eastman Chemical Products, Inc. is used for outer layers 30 and 20. Other suitable flexible copolyesters are Ecdel 9966 and Ecdel 9967 all available from Eastman. These particular copolyesters are characterized by inherent viscosities ranging from 1.05 to 1.28, and by the use of 1,4 cyclohexane dimethanol, 1,4 cyclohexane dicarboxylic acid, and polytetramethylene glycol ether as reactants in producing the flexible copolyester resins.

Various polymeric materials or blends of materials may be used for adhesive layers 32, 36 and 22 provided that the material used imparts sufficient adhesion between outer layers and the central or interior polyolefin layer. When a flexible copolyester is used for outer layer 30, the preferred material for layer 32 is a chemically modified ethylene methyl acrylate copolymer with a carboxylic acid or acid anhydride functionality. An especially preferred commercial resin is Plexar 3382 available from Quantum.

Other suitable commercial resins are Bynel E162 and Bynel E361, both chemically modified EVA materials available from Du Pont.

The central layer 34 of FIG. 3 comprises a polyolefin and more preferably an EVA such as those described earlier, or a very low density polyethylene (VLDPE) such as 1362 available from Union Carbide.

Figure 4:
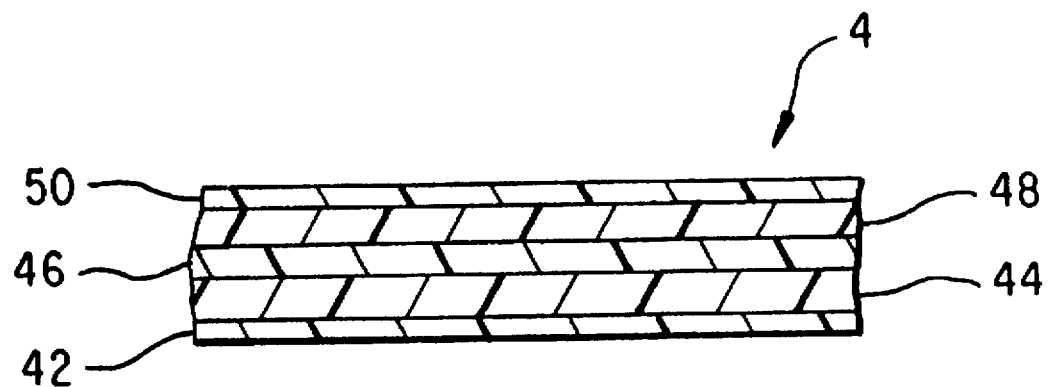
FIG. 4 is a schematic cross-section of still another film made in accordance with the present invention.

FIG. 4 shows an alternative embodiment being a five layer film 4. In applications where improved melt strength is required, the film described in FIG. 1 can be further improved by introducing a fractional melt index EVA into the center of the structure so that layer 46 of FIG. 4 is a fractional melt index (i.e. less than 1.0 melt index) EVA, and layers 48 and 44 disposed on either side of the layer 46, comprise the high vinyl acetate, high (greater than 1.0) melt index EVA described earlier for central layer 12. The total EVA content of this alternative embodiment is still preferably between 60% and 90%, and more preferably about 80% of the total film thickness. Examples of a fractional melt index EVA are Elvax 3135 and 3165, both available from Du Pont.

In one variation of this alternative embodiment, the central layers 44, 46 and 48 may be reversed. In this variation, the fractional melt index EVA would form layers 44 and 48, and the central layer 46 would comprise the high vinyl acetate EVA.

Layers 42 and 50 of FIG. 4 correspond to layers 14 and 10 respectively of FIG. 1.

Figure 5:
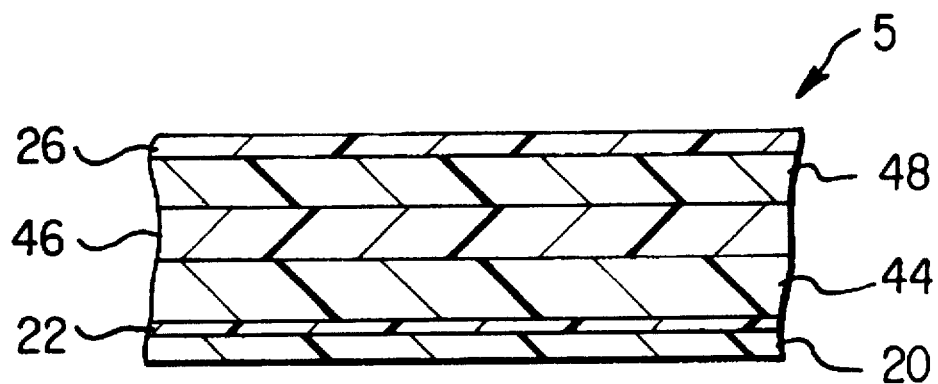
FIG. 5 is a schematic cross-section of another film made in accordance with the present invention.

In FIG. 5, a six layer film structure 5 is shown.

In this embodiment, a central layer 46 comprises a polyolefin, and preferably a fractional melt index EVA, high density polyethylene (HDPE), VLDPE, a blend of VLDPE and EVA, a blend of polypropylene (or EPC) and EVA, a blend of polypropylene (or EPC) and EMA, or a triple blend of polypropylene (or EPC) and EMA and EVA.

Intermediate layers 44 and 48 comprise an ethylene vinyl acetate copolymer having a melt index greater than about 1.0.

Outer layer 26 is a blend of high melt flow EPC and elastomer as described earlier for FIGS. 1 and 2.

Outer layer 20 is a copolyester as described above for FIG. 2.

Layer 22 comprises a polymeric adhesive as described above for FIG. 2.

Figure 5A:
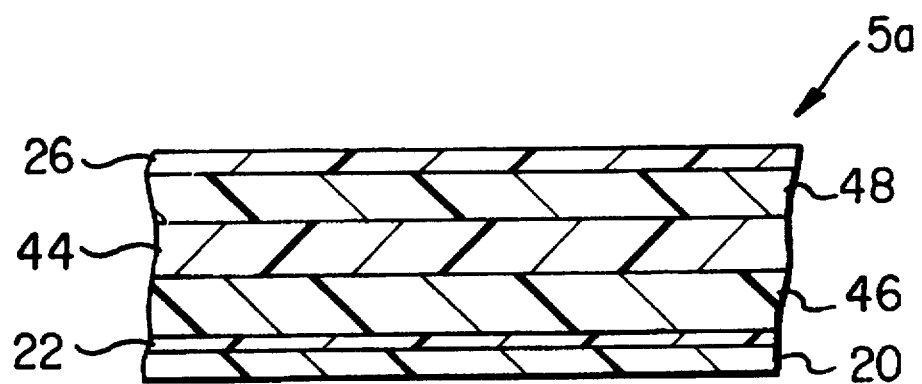
FIG. 5a is a schematic cross-section of an alternative film made in accordance with the present invention.
Figure 5B:
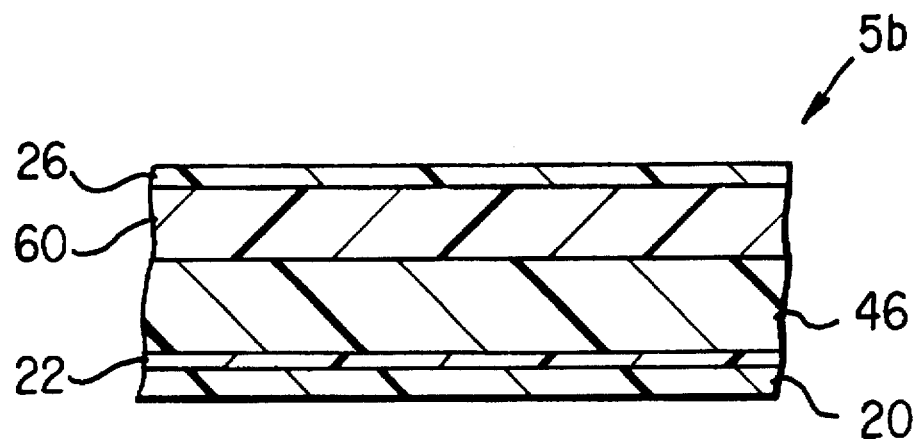
FIG. 5b is a schematic cross-section of another alternative film made in accordance with the present invention.

In an alternative arrangement for the film of FIG. 5, the relative position of layers 46 and 44 is reversed (see FIG. 5a). In the preferred embodiment, this puts identical or substantially identical layers 48 and 44 next to each other in the multilayer film structure. Even when produced from two discrete melt streams, layers 48 and 44 can become in effect one thickened layer 60 (see FIG. 5b). The inventor has found that bringing the EVA material of layer 44 closer to sealant layer 26 improves the radio frequency (RF) sealability of containers made from the inventive film.

Figure 6:
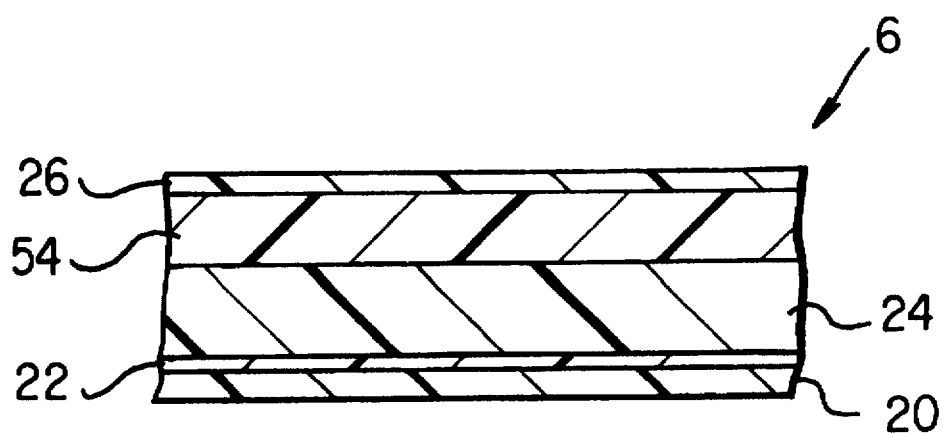
FIG. 6 is a schematic cross-section of yet another film made in accordance with the present invention.

In FIG. 6, a five layer film structure 6 is shown. This structure is essentially like the structure shown in FIG. 2, but with a layer 54 of a fractional melt index EVA (e.g. Elvax 3135 or Elvax 3165) added to the structure.

The films as described are preferably manufactured by a cast coextrusion process.

EXAMPLES

Exemplary multi-layer structures of Examples 1 through 3 and 6, as well as (comparative) Example 7, were cast coextruded and irradiated. These structures are viewed as potential replacements for polyvinyl chloride bags. Each of the examples, in part reflected in the detailed description of the preferred embodiments hereinbefore described, are discussed below with their respective formulations. The list for each example begins with the inside or sealant layer, and ending with the outside layer. Unless otherwise denoted, the Examples include the following materials:

$EPC_1$:=Fina Z 9550 (formerly having the experimental designation "NO54"), a high melt flow EPC with a melt flow of 10 grams/10 minutes (ASTM D 1238, Condition L)

$SEBS_1$=Kraton G 1652 flexible copolyester$_1$: Ecdel 9965 flexible copolyester$_2$ Ecdel 9967

$EVA_1$: =Elvax 3182-2

$VLDPE_1$: =DEFD 1362

$Adhesive_1$=Bynel E 361

$Adhesive_2$=Plexar 3382

In Example 1, the multi-layer film comprised 80% $EPC_1$+20% $SEBS_1$/$EVA_1$/$Adhesive_1$/Flexible Copolyester$_1$. The outer layer of flexible copolyester included about 5% by weight of the outer layer of a masterbatch including Irganox™ 1010, a high molecular weight stabilizer. This masterbatch was included in like amount in the flexible copolyester layer of Examples 2, 3, 6 and 7.

In Example 2, the multi-layer film comprised the same construction as the films of Example 1, but with a blend layer comprising 90% $EPC_1$+10% $SEBS_1$.

In Example 3 a multi-layer film comprised 80% $EPC_1$+20% $SEBS_1$/50%$VLDPE_1$+50%$EPC_1$/$VLDPE_1$/$Adhesive_2$/flexible copolyester$_1$.

Example 4 is made by the same process described above for Examples 1 through 3, and comprises 80% $EPC_1$+20% $SEBS_1$/$EVA_1$/50% $EVA_1$+50% $EPC_1$/$EVA_1$/$Adhesive_1$/flexible copolyester$_1$.

Example 5 is made by the same process described above for Examples 1 through 3, and comprises 80% $EPC_1$+20% $SEBS_1$/$EVA_1$/$EVA_1$/50% $EVA_1$+50% $EPC_1$/$Adhesive_1$/flexible copolyester$_1$.

Example 6: A film was made by the same process described above for Example 1, and had the structure: 80% $EPC_1$+20% $SEBS_1$/$EVA_1$/$Adhesive_1$/Flexible Copolyester$_2$.

Example 7 (a Comparative Example): A film was made in accordance with Example 6, except that this comparative example used a low melt flow EPC (Fina Z 9450, having a melt flow of 5 grams/10 minutes (ASTM D 1238, Condition L)) in the sealant layer, in place of the high melt flow EPC used in Example 6.

Figure 7:
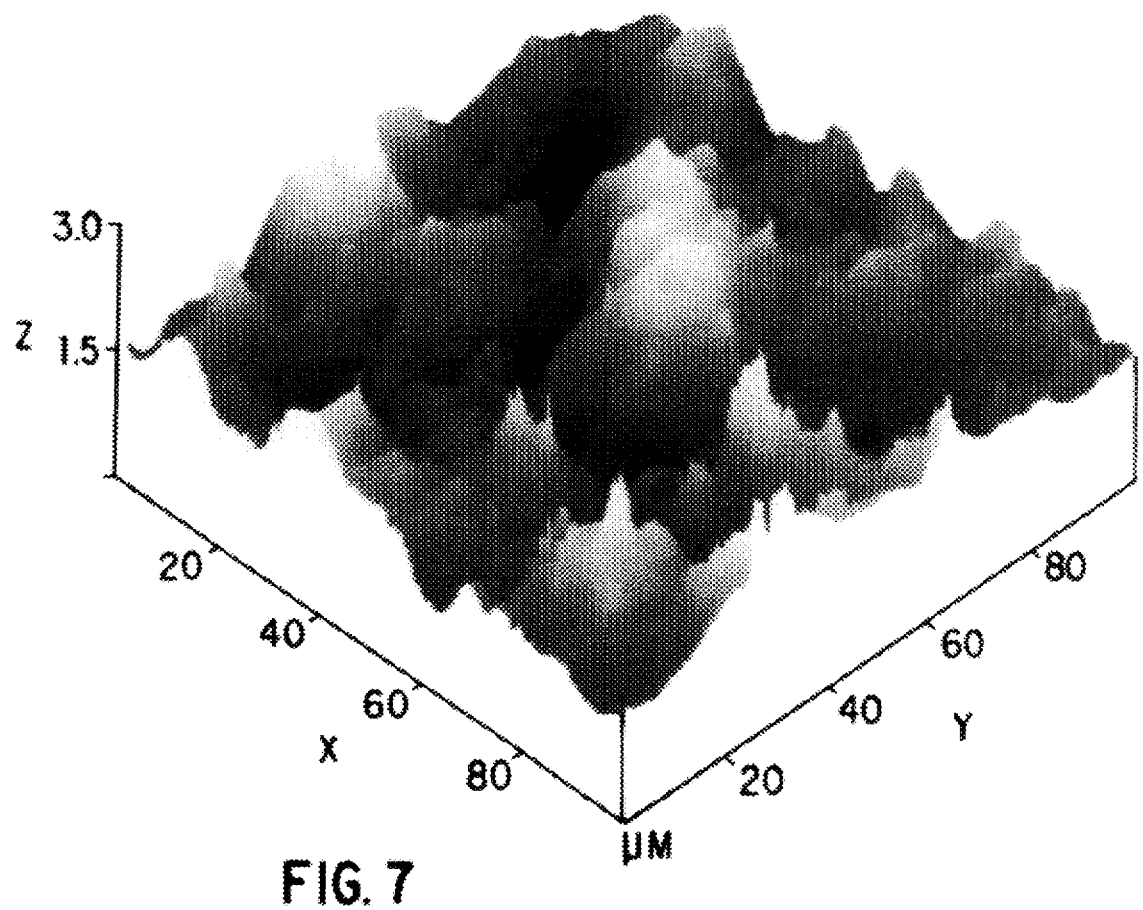
FIG. 7 is a graphical atomic force microscopy (AFM) image showing the surface roughness of the sealant layer of a film made in accordance with the present invention.
Figure 8:
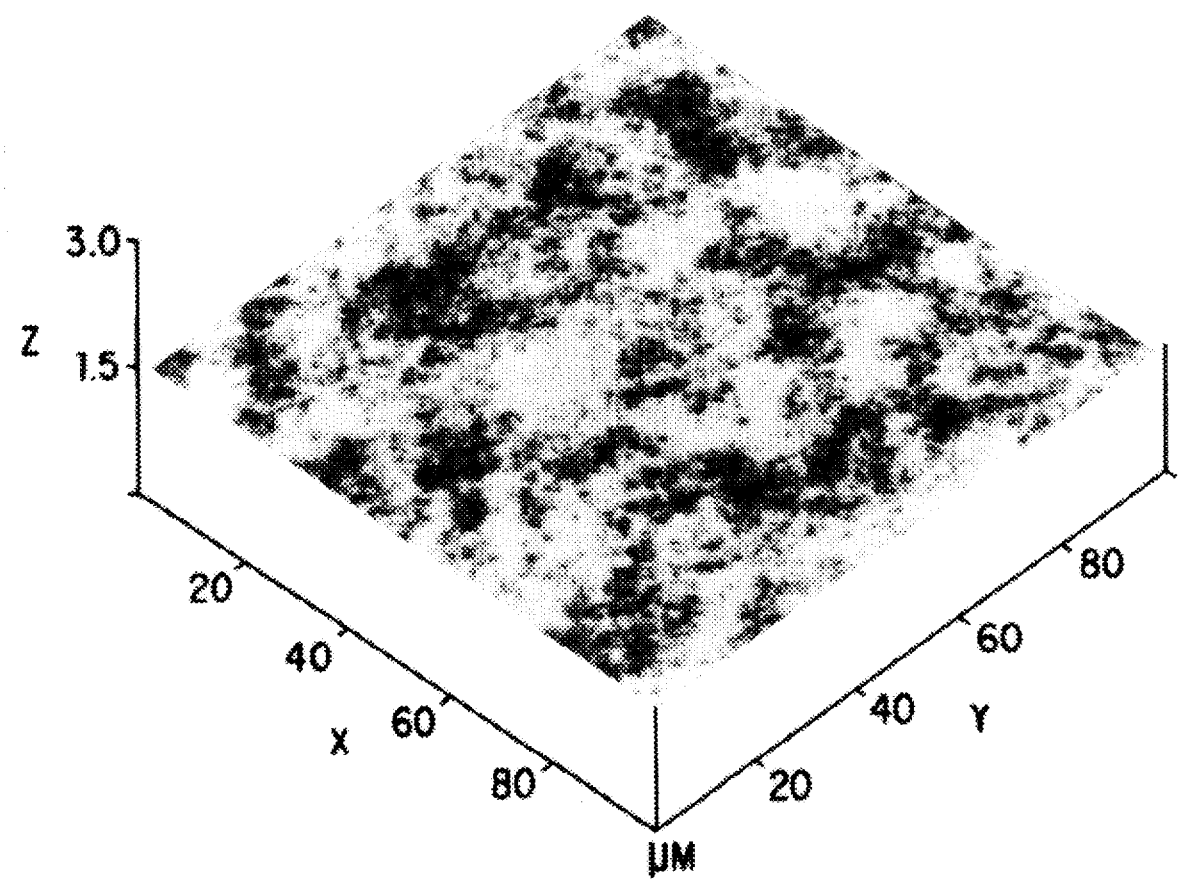
FIG. 8 is a graphical AFM image showing the surface roughness of the sealant layer of a comparative film.

Example 8: Film samples from Example 6 and (comparative) Example 7 were analyzed for RMS (root mean square) surface roughness of the sealant layer thereof by atomic force microscopy (AFM). AFM was performed in contact mode using a Digital Instruments Nanoscope III™ which employs a silicon nitride tip. Measurements were made over three 100 μm×100 μm areas on each film sample. The RMS roughness of the film of Example 6 was determined to be 393.8 nm, plus or minus 35.5 nm. This is shown graphically in FIG. 7, wherein the numerical values indicated on the x, y, and z coordinates are in micrometers (μm). The individual RMS measurements for each of the three film samples of Example 6 were 346.09 nm, 403.92 nm, and 431.39 nm, respectively. In stark contrast, the RMS roughness of the comparatively smooth film of Example 7 was 7.7, plus or minus 0.2 nm. This is shown graphically in FIG. 8, wherein the numerical values indicated on the x, y, and z coordinates are also in micrometers (μm). Individual RMS measurements for each of the three film samples of Example 7 were 7.433 nm, 7.635 nm, and 7.923 nm, respectively. Accordingly, a clear distinction in surface roughness exists between sealant layers of high melt flow EPC and SEBS (Example 6/FIG. 7) verses low melt flow EPC and SEBS (comparative Example 7/FIG. 8).

Example 9: Various cross-sections were taken of the sealant layers of film samples from Examples 6 and 7. These cross-sections were then examined under a Hitachi S-4500 scanning electron microscope (SEM) at various magnifications ranging from 100X to 10,000X. In the sealant layer of (comparative) Example 7, SEBS was present in the form of very thin strands or fibrils which are not visible to the naked eye and which do not contribute to an effective surface roughness (i.e., effective to reduce blocking). On the other hand, SEM analysis of the sealant layer of Example 6 clearly showed SEBS domains which were generally tubular-shaped with tapered ends, and with cross-sectional areas which ranged from about 0.07 to about 8.1 square micrometers ($\mu m^2$), with an average cross-sectional area of 1.2 $\mu m^2$ and a standard deviation of 1.4. Four different cross-sectional sample sites were analyzed, two in the 2-3 film direction and two in the 1-3 film direction. The two 2-3 film direction sites had SEBS domains with cross-sectional areas ranging from 0.13-5.4 $\mu m^2$ and 0.18-2.1 $\mu m^2$, respectively. The two 1-3 film direction sites had SEBS domains with cross-sectional areas ranging from 0.07-8.1 $\mu m^2$ and 0.1-7.7 $\mu m^2$, respectively.

The films of Example 6 were found to have less sealant layer-to-sealant layer adhesion and easier openability than the films of comparative Example 7.

Example 10: The films from Example 6, having a high melt flow EPC (10 g/10 min.) and SEBS in the sealant layer, and (comparative) Example 7, having a low melt flow EPC (5 g/10 min.) and SEBS in the sealant layer, were tested for the optical properties total transmission, haze, clarity, and gloss. These tests were performed both on dry film samples and film samples which had been coated with a layer of mineral oil on the sealant layer thereof. This was done to simulate and compare the optical properties which would likely result from medical pouches made from such films both before and after being filled with a liquid.

Total transmission and haze were determined in accordance with ASTM D 1003—Method A, clarity was determined in accordance with ASTM D 1746, and gloss was determined in accordance with ASTM D2457. A total of four unpigmented samples were tested for each film and for each condition (i.e., with and without mineral oil). The results for each of the four samples were averaged and are shown in Table 1 below.

TABLE 1

| FILM | TOTAL TRANSMISSION (%) | HAZE (%) | CLARITY (%) | GLOSS (45°) |
|---|---|---|---|---|
| Ex. 7 (w/o oil) | 93.8 | 1.2 | 16.9 | 85 |
| Ex. 6 (w/o oil) | 94.0 | 20.9 | 0.3 | 42 |

TABLE 1-continued

| FILM | TOTAL TRANSMISSION (%) | HAZE (%) | CLARITY (%) | GLOSS (45°) |
|---|---|---|---|---|
| Ex. 7 (w/oil) | 93.8 | 1.5 | 6.6 | 59 |
| Ex. 6 (w/oil) | 94.0 | 3.3 | 3.2 | 56 |

The sealant layer in the films of Example 6 were observed to have a relatively rough (i.e., textured) finish as compared to the sealant layer in the films of comparative Example 7, which had a relatively smooth finish. As shown in Table 1, the clarity and gloss values of the dry (non oil-coated) films of Example 6 were significantly lower than those for the films of Example 7. Additionally, the haze value of the dry films of Example 6 was higher than that of the films of Example 7, although the total transmission values for both films were very similar. The initially-poor optical properties of the films of the present invention are due to the incompatibility of SEBS with high melt flow EPC in the sealant layer, and the resultant rough or textured finish thereof, which causes transmitted light to scatter but does not significantly reduce the amount of light which is transmitted. When the sealant layers of the films were coated with a layer of mineral oil, however (to simulate a liquid-filled pouch), the optical properties of the films of Example 6 dramatically improved, and were much closer to the optical properties of the films of Example 7.

Visual observation of medical pouches made from the films of Examples 6 and 7 were consistent with the above test results. Empty pouches made from the film of Example 6 exhibited more haze and less clarity than those made from the film of Example 7. When filled with water, the haze in the pouches of Example 6 virtually disappeared such that the optical properties of both sets of pouches were nearly identical. Visual inspection of the contents in both sets of pouches could thus be made with an equal degree of accuracy.

EPC resins with intermediate melt flow rates of e.g. 9, 11, 12, 13, and 14 grams/10 minutes (ASTM D 1238, Condition L) can also be used in the present invention.

Films in accordance with the present invention are preferably cross-linked. This is preferably done by irradiation, i.e. bombarding the film with particulate and non-particulate radiations such as high energy electrons from an accelerator or cobalt-60 gamma rays, to cross-link the materials of the film. Cross-linking increases the structural strength of film and/or the force at which the material can be stretched before tearing apart, and may also improve the optical properties of the film and change the high temperature properties of the film. A preferred irradiation dosage level is in the range of from about 2 Megarads (M.R.) to about 8 M.R.

Cross-linking may also be accomplished chemically e.g. by the use of peroxides.

Pouches made in accordance with the present invention may be sealed by various means well known in the art, including radiation frequency (R.F.) sealing, impulse and hot bar sealing.

The films according to the present invention are preferably formed by cast coextrusion as a tubular film. Containers for medical applications, or other desired end uses can be made directly from the coextruded, tubular film, or alternatively from rollstock material obtained from the tube after it has been slit and ply separated. A hot blown process can also be used to make the film, although optical properties of the resulting pouch would be inferior to those from a cast coextrusion process. Other processes, such as extrusion coating, conventional lamination, slot die extrusion, etc. can also be used to make the film of the present invention, although these alternative processes can be more difficult or less efficient than the preferred method.

It should be noted that the detailed description and specific examples which indicate the presently preferred embodiments of the invention are given by way of illustration only. Various changes and modifications within the spirit and scope of the claims will become apparent to those of ordinary skill in the art upon review of the above detailed description and examples.

What is claimed is:

1. An impact resistant film comprising a layer which comprises elastomer and high melt flow ethylene propylene copolymer having a melt flow of between 8 and 15 grams/10 minutes, said elastomer constituting a discontinuous phase dispersed throughout a continuous phase of said high melt flow ethylene propylene copolymer such that said first outer layer has a root mean square (RMS) surface roughness ranging from about 10 to about 500 nm.

2. The film of claim 1 wherein said layer has a root mean square surface roughness ranging from about 100 nm to about 450 nm.

3. The film of claim 1, wherein said elastomer is present in discrete domains which have a cross-sectional area ranging from about 0.01 to about 10 square micrometers ($\mu m^2$).

4. The film of claim 1, wherein said elastomer comprises styrene ethylene butylene styrene copolymer.

5. The film of claim 1, wherein said ethylene propylene copolymer has an ethylene content ranging from about 4 to about 6 percent by weight.

6. The film of claim 1, further including a second layer comprising a material selected from the group consisting of
    (a) a high melt flow ethylene propylene copolymer,
    (b) copolyester, and
    (c) polyamide.

7. The film of claim 6, wherein said layer comprising elastomer and high melt flow ethylene propylene copolymer and said second layer are outer layers, said film further including an interior layer disposed between said outer layers, said interior layer comprising a material selected from the group consisting of
    (a) ethylene vinyl acetate copolymer,
    (b) ethylene methyl acrylate copolymer,
    (c) blends of (a) and (b),
    (d) very low density polyethylene,
    (e) homogeneous ethylene/alpha-olefin copolymer, and
    (f) ethylene butyl acrylate.

8. The film of claim 7, further including one or more polymeric adhesive layers disposed between and adhering one or both of the respective outer layers to said interior layer.

9. The film of claim 8, wherein said polymeric adhesive comprises a material selected from the group consisting of
    (a) modified ethylene unsaturated ester copolymer,
    (b) modified ethylene vinyl acetate copolymer,
    (c) modified ethylene methyl acrylate copolymer,
    (d) modified linear low density polyethylene,
    (e) modified very low density polyethylene,
    (f) modified high density polyethylene,
    (g) modified polypropylene,
    (h) modified styrene ethylene butylene styrene copolymer,
    (i) ethylene propylene rubber,
    (j) modified ethylene butyl acrylate.

10. A medical pouch made from the film of claim 1.

11. An impact resistant film comprising a layer which comprises elastomer and high melt flow ethylene propylene copolymer having a melt flow of between 8 and 15 grams/10 minutes, said elastomer constituting a discontinuous phase dispersed throughout a continuous phase of said high melt flow ethylene propylene copolymer such that said elastomer is present in discrete domains which have a cross-sectional area ranging from about 0.01 to about 10 square micrometers ($\mu m^2$).

12. The film of claim 11, wherein said elastomer domains have a cross-sectional area ranging from about 0.01 to about 8 $\mu m^2$.

13. The film of claim 11, wherein said elastomer comprises styrene ethylene butylene styrene copolymer.

14. The film of claim 11, wherein said ethylene propylene copolymer has an ethylene content ranging from about 4 to about 6 percent by weight.

15. The film of claim 11, further including a second layer comprising a material selected from the group consisting of
    (a) high melt flow ethylene propylene copolymer,
    (b) copolyester, and
    (c) polyamide.

16. The film of claim 15, wherein said layer comprising elastomer and high melt flow ethylene propylene copolymer and said second layer are outer layers, said film further including an interior layer disposed between said outer layers, said interior layer comprising a material selected from the group consisting of
    (a) ethylene vinyl acetate copolymer,
    (b) ethylene methyl acrylate copolymer,
    (c) blends of (a) and (b),
    (d) very low density polyethylene,
    (e) homogeneous ethylene/alpha-olefin copolymer, and
    (f) ethylene butyl acrylate.

17. The film of claim 16, further including one or more polymeric adhesive layers disposed between and adhering one or both of the respective outer layers to said interior layer.

18. The film of claim 17, wherein said polymeric adhesive comprises a material selected from the group consisting of
    (a) modified ethylene unsaturated ester copolymer,
    (b) modified ethylene vinyl acetate copolymer,
    (c) modified ethylene methyl acrylate copolymer,
    (d) modified linear low density polyethylene,
    (e) modified very low density polyethylene,
    (f) modified high density polyethylene,
    (g) modified polypropylene,
    (h) modified styrene ethylene butylene styrene copolymer,
    (i) ethylene propylene rubber, and
    (j) modified ethylene butyl acrylate.

19. A medical pouch made from the film of claim 11.

* * * * *